United States Patent
Wei

(10) Patent No.: US 9,326,261 B2
(45) Date of Patent: Apr. 26, 2016

(54) METHOD AND APPARATUS FOR SYNCHRONIZING POPULARITY VALUE OF CACHE DATA AND METHOD, APPARATUS, AND SYSTEM FOR DISTRIBUTED CACHING

(71) Applicant: HUAWEI TECHNOLOGIES CO., LTD., Shenzhen (CN)

(72) Inventor: Wei Wei, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 117 days.

(21) Appl. No.: 14/154,749

(22) Filed: Jan. 14, 2014

(65) Prior Publication Data

US 2014/0185606 A1 Jul. 3, 2014

Related U.S. Application Data

(63) Continuation of application No. PCT/CN2012/078499, filed on Jul. 11, 2012.

(30) Foreign Application Priority Data

Jul. 15, 2011 (CN) .......................... 2011 1 0199469

(51) Int. Cl.
*H04J 3/06* (2006.01)
*H04W 56/00* (2009.01)
(Continued)

(52) U.S. Cl.
CPC ........... *H04W 56/001* (2013.01); *H04L 67/288* (2013.01); *H04L 67/2842* (2013.01); *H04W 4/18* (2013.01)

(58) Field of Classification Search
None
See application file for complete search history.

(56) References Cited

U.S. PATENT DOCUMENTS

| | | | |
|---|---|---|---|
| 2005/0102300 A1 | 5/2005 | Madsen | |
| 2008/0153460 A1* | 6/2008 | Chan et al. | 455/412.1 |
| 2009/0300322 A1* | 12/2009 | Mercer | 711/219 |

FOREIGN PATENT DOCUMENTS

| CN | 1387643 A | 12/2002 |
|---|---|---|
| CN | 1791213 A | 6/2006 |
| CN | 101196852 A | 6/2008 |

(Continued)

OTHER PUBLICATIONS

Extended European Search Report issued on May 21, 2014 in corresponding European Application No. 12 814 835.0.

(Continued)

*Primary Examiner* — Afshawn Towfighi
(74) *Attorney, Agent, or Firm* — Staas & Halsey LLP

(57) ABSTRACT

Embodiments of the present invention include a method for synchronizing a popularity value of distributed cache data, a method, an apparatus, and a system for cooperative and distributed caching. The synchronizing method includes: receiving, by a first base station, a request for accessing a packet domain service sent by a user equipment; if the first base station determines that the packet domain service is locally cached, sending the packet domain service to the user equipment and incrementing a current popularity value of the packet domain service in a list of locally cached content of the first base station according to a preset function; and sending, when the current popularity value of the packet domain service is accumulated to a preset threshold, the current popularity value to a popularity information synchronizing node for synchronization, and clearing the current popularity value locally cached. The present invention saves a transmission bandwidth of an IUB interface.

17 Claims, 7 Drawing Sheets

(51) Int. Cl.
*H04W 4/18* (2009.01)
*H04L 29/08* (2006.01)

(56) References Cited

FOREIGN PATENT DOCUMENTS

| CN | 101291342 A | 10/2008 |
| CN | 101719936 A | 6/2010 |
| CN | 102244900 A | 11/2011 |
| EP | 2 550 788 | 9/2011 |
| EP | 2 503 759 A1 | 9/2012 |
| WO | 2006/138249 A2 | 12/2006 |
| WO | 2010/017308 A1 | 2/2010 |
| WO | 2011-116819 A1 | 9/2011 |

OTHER PUBLICATIONS

International Search Report mailed Nov. 8, 2012 in corresponding International Patent Application No. PCT/CN2012/078499.
International Search Report issued Nov. 8, 2011, in corresponding International Patent Application No. PCT/CN2012/078499.
Chinese Search Report issued Jun. 24, 2013, in corresponding Chinese Patent Application No. 201110199649.9.
Japanese Office Action dated Jun. 30, 2015 in corresponding Japanese Patent Application No. 2014-519395.

* cited by examiner

METHOD AND APPARATUS FOR SYNCHRONIZING POPULARITY VALUE OF CACHE DATA AND METHOD, APPARATUS, AND SYSTEM FOR DISTRIBUTED CACHING

CROSS-REFERENCE TO RELATED APPLICATION

This application is a continuation of International Application No. PCT/CN2012/078499 filed on Jul. 11, 2012, which claims priority to Chinese Patent Application No. 201110199469.9, filed on Jul. 15, 2011, both of which are hereby incorporated by reference in their entireties.

FIELD

Embodiments of the present invention relate to the field of wireless communications technologies, and in particular, to a method and an apparatus for synchronizing a popularity value of distributed cache data, and a method, an apparatus and a system for cooperative and distributed caching of cache data.

BACKGROUND

In a universal mobile telecommunications system (UMTS, Universal Mobile Telecommunications System), a high speed cache (Cache) may be deployed on a radio network controller (RNC, Radio Network Controller) or a base station (NodeB).

If the cache is deployed on an RNC, a local storage medium and popularity information need to be deployed on the RNC. In addition, the RNC parses an application layer data packet, and locally caches content that meets a cache decision condition. The RNC is responsible for maintaining cached content and content whose popularity does not reach a threshold, but subsequently may further cache resource popularity information. Capacity of the local storage medium deployed on the RNC is maximum capacity of the Cache. A Cache service may be unloaded with reference to local traffic. That is, the RNC unloads, through a Gi interface, service traffic of a packet service (PS, Packet Service) of an external network that does not need to pass a core network, and directly sends the traffic to a corresponding service provider (SP, Service Provider) to save a bandwidth from the RNC to a core network side. Meanwhile, when content accessed by a user equipment is already cached on the RNC, the content may be extracted directly from the local storage medium of the RNC and fed back to the user equipment, thereby saving a transmission bandwidth of an Iu interface and a subsequent transmission network bandwidth while at the same time reducing an access delay of the user equipment. On a UMTS network, however, a transmission bandwidth of an IUB interface cannot be saved when the Cache is deployed on the RNC; and this does not help the UMTS network to be smoothly upgraded to LTE.

If the Cache is deployed on a NodeB, the popularity information and the local storage medium are deployed on the NodeB. To parse the application layer data packet, the NodeB needs to determine whether the content accessed by the user equipment can be locally cached and then a PS user plane needs to be moved down to the NodeB. Similarly, the Cache service may also be combined with a local traffic unloading technology. The NodeB provides the Gi interface, and the PS service of the external network is unloaded through the Gi interface and directly sent to the corresponding SP, thereby saving the transmission bandwidth of the Iub interface and the subsequent network transmission bandwidth. However, because NodeBs are closer to a network edge, a single NodeB covers a limited number of user equipments and a hit rate will be relatively low, it is only applicable to indoor coverage and low-mobility scenarios. In addition, user equipments covered by different NodeBs may access same hot content, causing the same hot content to be cached on multiple NodeBs and causing same content to occupy cache resources of the multiple NodeBs.

In a process of researching and practicing the prior art, it is found that in an existing implementation manner, Cache information is managed inside a single network element no matter whether the Cache is deployed on the RNC or the NodeB, and a storage space to which a single network element can be mounted is limited. In addition, if the Cache is deployed on the RNC, this is not conducive to smooth upgrade to LTE and the transmission bandwidth of the IUB interface cannot be saved; if the Cache is deployed on the NodeB, because the number of covered user equipments is limited, the hit rate will be relatively low, it is only applicable to indoor coverage and low-mobility scenarios, and different NodeBs may repetitively cache a same resource, thereby causing a failure to implement sharing inside a network.

SUMMARY

Embodiments of the present invention provide a method, an apparatus, and a system for synchronizing a popularity value of distributed cache data, so as to solve a technical problem in the prior art that cache data sharing cannot be implemented inside a network.

The embodiments of the present invention provide a method, an apparatus, and a system for cooperative and distributed caching of cache data, so as to save a transmission bandwidth of an IUB interface.

To solve the preceding technical problem, an embodiment of the present invention provides a method for synchronizing a popularity value of distributed cache data, where the method is applied to a radio access network, the radio access network includes a popularity information synchronizing node and base stations managed by the popularity information synchronizing node, a cache configured to store hot content is deployed in a distributed manner on the base stations, and the method includes:

receiving, by a first base station of the radio access network, a request for accessing a packet domain service sent by a user equipment;

responding to the packet domain service request, and if the first base station determines that the packet domain service is locally cached, sending the packet domain service to the user equipment and incrementing a current popularity value of the packet domain service in a list of locally cached content of the first base station according to a preset function; and sending, by the first base station when the current popularity value of the packet domain service is accumulated to a preset threshold, the current popularity value of the packet domain service to the popularity information synchronizing node for synchronization, and clearing the current popularity value locally cached by the first base station.

An embodiment of the present invention further provides a method for cooperative and distributed caching of cache data, where the method is applied to a radio access network, the radio access network includes a popularity information synchronizing node and base stations managed by the popularity information synchronizing node, and the method includes:

receiving, by the popularity information synchronizing node, a request sent by a first base station of the radio access network for synchronizing a popularity value of a packet domain service; and updating, by the popularity information synchronizing node, a popularity value that corresponds to the packet domain service in a cached-content list according to the request.

Accordingly, an embodiment of the present invention further provides an apparatus for synchronizing a popularity value of distributed cache data, where the apparatus is applied to a radio access network, the radio access network includes a popularity information synchronizing node and base stations managed by the popularity information synchronizing node, a cache used to store hot content is deployed in a distributed manner on the base stations, and the apparatus includes:

a first receiving unit, configured to receive a request for accessing a packet domain service sent by a user equipment;

a determining unit, configured to respond to the packet domain service request, determine whether the packet domain service is locally cached, and send a determining result;

a first sending unit, configured to send, when receiving a determining result of Yes, the packet domain service to the user equipment;

a first accumulating unit, configured to increment, when receiving the determining result of Yes, a current popularity value of the packet domain service in a list of locally cached content of a first base station of the radio access network according to a preset function; and a synchronizing unit, configured to send, when the current popularity value of the packet domain service is accumulated to a preset threshold, the current popularity value of the packet domain service to the popularity information synchronizing node for synchronization, and clear the current popularity value locally cached by the first base station.

An embodiment of the present invention further provides an apparatus for cooperative and distributed caching of cache data, where the apparatus is applied to a radio access network, the radio access network includes a popularity information synchronizing node and base stations managed by the popularity information synchronizing node, and the apparatus includes:

a first receiving unit, configured to receive a request sent by at least one first base station of the radio access network for synchronizing a popularity value of a packet domain service; and a synchronizing unit, configured to update a popularity value that corresponds to the packet domain service in a cached-content list according to the request.

An embodiment of the present invention further provides a system for synchronizing a popularity value of distributed cache data, including a popularity information synchronizing node and at least one base station managed by the popularity information synchronizing node, where the base station includes the apparatus for synchronizing a popularity value of high speed cache data, and the popularity information synchronizing node includes the apparatus for cooperative and distributed caching of cache data.

As can be seen from the foregoing description, when popularity of content cached on a base station (NodeB) reaches a certain threshold, synchronization to a radio network controller (RNC) is required, so that the RNC accumulates a popularity value of the cached content in a cached-content list, and the NodeB clears a popularity value in a list of locally cached content after the synchronization is performed. That is, with use of a distributed Cache according to the embodiments, the RNC does not need to cache a large amount of resource data, thereby greatly saving a storage space of the RNC. In addition, content caching is scattered to various NodeBs, and this is equivalent to expansion of total storage capacity, thereby solving a technical problem about repeated caching of a same resource and implementing sharing inside a network.

DESCRIPTION OF EMBODIMENTS

Figure 1:
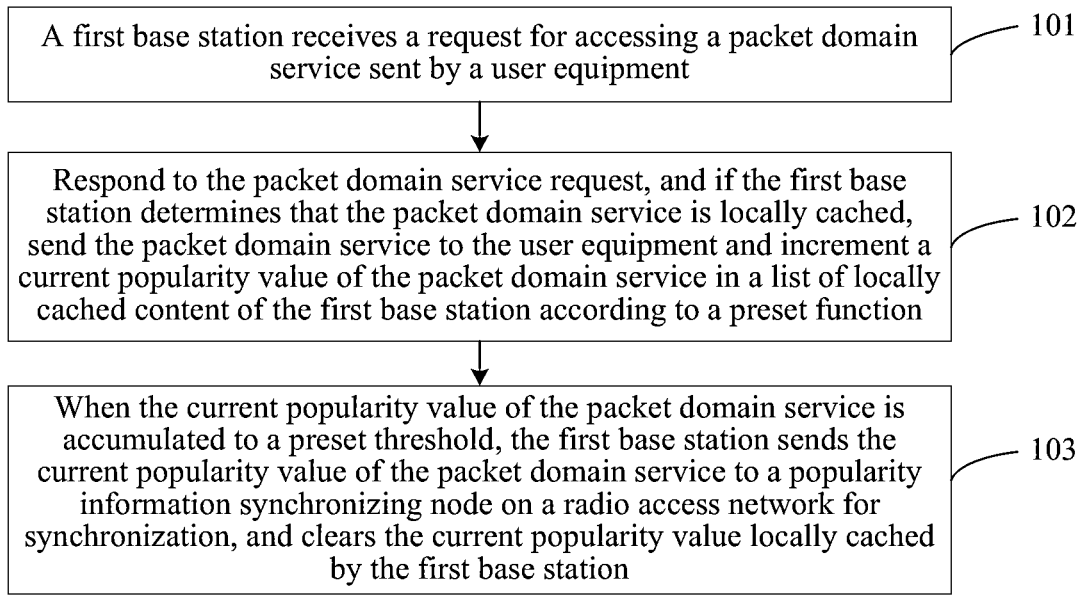
FIG. 1 is a flowchart of a method for synchronizing a popularity value of cache data according to an embodiment of the present invention.

In the embodiments of the present invention, a UMTS network is used as an example for description. In the embodiments, a radio access network RAN includes NodeBs and an RNC. A cache configured to store hot content is deployed in a distributed manner on multiple NodeBs managed by the RNC. Cooperative caching may be implemented between the NodeBs and the RNC. Popularity information of user-accessed content is uniformly maintained by a popularity information synchronizing node. The popularity information synchronizing node may be a hub base station or the RNC. In the embodiments, the popularity information synchronizing node is the RNC.

Physical links are newly established and corresponding signaling is added between the NodeBs subordinate to the RNC to form a network that includes the RNC and the subordinate NodeBs, so as to mutually transmit cached files and storage locations of the cached files on a UTRAN side. A connection between one NodeB and another NodeB may be an IP connection, a physical link between them may be in a wired or wireless form, and a network topology structure between them may be star, ring, or the like.

In the embodiments of the present invention, each NodeB may maintain simply one list, that is, URLs and local popularity of content cached on a local NodeB. The RNC may maintain three lists: (1) a list of current popularity and storage locations of content cached on each NodeB; (2) popularity records of pre-popular content, that is, content that was once accessed by a user but whose popularity does not yet reach a Cache threshold; and (3) a maintenance list of subscribed Cache content, that is, a list of content specified by a subscription SP for caching.

When popularity of content cached on a NodeB reaches a certain threshold, synchronization to the RNC is required. The RNC accumulates the popularity of the content in a cached-content maintenance list. After the synchronization is performed, the local popularity on the NodeB is cleared.

With use of the distributed Cache, the RNC does not need to cache a large amount of resource data but only needs to cache three lists, thereby greatly saving a storage space of the RNC. In addition, content caching is scattered to various NodeBs, and this is equivalent to expansion of total storage capacity. As a hub network element of the Cache network, the RNC has little impact on an existing system. Hardware of the RNC does not require any change when a common UMTS network is upgraded to the Cache network. During subsequent upgrade of the UMTS Cache network to LTE, network delayering does not influence an existing solution, as long as the three lists stored on the RNC are maintained on a new hub network element.

As a hub network element of the meshed Cache network, the RNC only needs to maintain three lists to manage Cache content of the entire network. Classification and a search sequence of the three lists may enable the RNC to schedule the Cache network at the fastest speed. According to the idea of the meshed Cache network, content cached on each NodeB on the network can provide a Cache service for users covered by all NodeBs on the network, thereby greatly improving a Cache hit rate and ensuring the hit rate even in a mobility scenario.

To help a person of ordinary skill in the art to better understand the solutions according to the embodiments of the present invention, the following further describes in detail the embodiments of the present invention with reference to the accompanying drawings and implementation manners.

Refer to FIG. 1, which is a flowchart of a method for synchronizing a popularity value of cache data according to an embodiment of the present invention. The method is applied to a radio access network that includes a radio network controller and base stations managed by the radio network controller. A cache configured to store hot content is deployed in a distributed manner on the multiple base stations. The method includes the following steps:

Step 101: A first base station receives a request for accessing a packet domain service sent by a user equipment, where the packet domain service is web page content or the like but is not limited to this.

Step 102: Respond to the packet domain service request, and if the first base station determines that the packet domain service is locally cached, send the packet domain service to the user equipment and increment a current popularity value of the packet domain service in a list of locally cached content of the first base station according to a preset function.

The list of locally cached content is maintained by the base station and used to record popularity values of content locally cached. For example, the list may be uniform resource identifiers and local popularity of content cached on the base station.

Step 103: When the current popularity value of the packet domain service is accumulated to a preset threshold, the first base station sends the current popularity value of the packet domain service to a popularity information synchronizing node on the radio access network for synchronization, and clears the current popularity value locally cached by the first base station.

Optionally, the method may further include: if the first base station determines that the packet domain service is not locally cached, acquiring information of a location in which the packet domain service is cached from a cached-content list, a subscribed-content list, or a pre-popular content list maintained by the popularity information synchronizing node, acquiring the packet domain service from a base station or a service provider that corresponds to the location information, and sending the acquired packet domain service to the user equipment.

Optionally, the method may further include: sending, by the first base station to the popularity information synchronizing node, a request for allocating a cache node; receiving a response of the popularity information synchronizing node, where the response carries location information of a second base station that is allocated by the popularity information synchronizing node and is capable of caching the packet domain service; and sending, by the first base station, the packet domain service to the second base station according to the location information, so that the second base station caches the packet domain service and updates the current popularity value of the packet domain service according to the preset function.

Optionally, the method may further include: sending, by the first base station, a cached-content deletion request to the popularity information synchronizing node; receiving, by the first base station, a cached-content deletion response sent by the popularity information synchronizing node; and deleting, by the first base station, a packet domain service of locally cached content according to the cached-content deletion response.

Optionally, the popularity information synchronizing node is a hub base station or the radio network controller to which the base stations belong.

Based on the foregoing description, a base station receives a request for accessing a packet domain service sent by a user equipment; if determining that the packet domain service is locally cached, the base station sends the packet domain service to the user equipment, and increments a current popularity value of the packet domain service in a list of locally cached content according to a preset function; and when the current popularity value of the packet domain service is accumulated to a preset threshold, the base station sends the current popularity value to a radio network controller or a hub base station for synchronization, and clears the current popularity value.

Optionally, the method may further include: if the base station determines that the packet domain service is not recorded in the list of locally cached content, acquiring information of a location in which the packet domain service is cached from a cached-content list, a subscribed-content list, or a pre-popular content list maintained by the radio network controller (RNC, Radio Network Controller) or the hub base station (HUB NodeB), acquiring the packet domain service from a base station or a service provider that corresponds to the location information, and sending the acquired packet domain service to the user equipment, where the cached-content list includes: a resource name, current popularity, and a storage location of the packet domain service; the subscribed-content list includes: a subscribed resource; and the pre-popular content list includes: a resource name and current popularity; and this specifically includes the following cases:

if the base station determines that the packet domain service is not recorded in the list of locally cached content, the base station acquires the information of the location in which the packet domain service is cached from the cached-content list of the radio network controller or the hub base station, acquires the packet domain service from the base station that corresponds to the location information, and sends the packet domain service to the user equipment; the base station that corresponds to the location information (such as an IP address) increments current popularity of the packet domain service by 1; and the acquiring the packet domain service from the base station that corresponds to the IP address includes: acquiring the packet domain service from the base station that corresponds to the IP address through an established IP link, or acquiring the packet domain service from the base station that corresponds to the IP address through the radio network controller or the hub base station; or if the base station determines that the packet domain service is not recorded in the list of locally cached content, the base station acquires the information (that is, the IP address) of the location in which the packet domain service is cached from the subscribed-content list of the radio network controller or the hub base station, where the packet domain service is subscription information; and acquires the packet domain service from the service provider that corresponds to the location information, locally caches the packet domain service, adds the subscription information to the list of locally cached content, and sends the packet domain service to the user equipment; or if the base station determines that the packet domain service is not recorded in the list of locally cached content and fails to acquire the information of the location in which the packet domain service is cached from the cached-content list of the radio network controller or the hub base station, the base station acquires the information of the location in which the packet domain service is cached from the subscribed-content list of the radio network controller or the hub base station, where the packet domain service is subscription information; caches the subscription information into the list of locally cached content, acquires the packet domain service from the service provider that corresponds to the location information, sends the packet domain service to the user equipment, and locally caches the packet domain service; or if the base station determines that the packet domain service is not recorded in the list of locally cached content and fails to acquire the information of the location in which the packet domain service is cached from the cached-content list and the subscribed-content list of the radio network controller or the hub base station, the base station acquires location information of the service provider of the packet domain service and acquires information indicating that the current popularity value of the packet domain service meets the preset threshold from the pre-popular content list of the radio network controller or the hub base station; and sends the acquired packet domain service to the user equipment after acquiring the packet domain service from the service provider; and locally caches the packet domain service and adds a record to the list of locally cached content; or the base station acquires location information of the service provider of the packet domain service and acquires information indicating that the current popularity value of the packet domain service does not meet the preset threshold from the pre-popular content list of the radio network controller or the hub base station, and directly sends the packet domain service to the user equipment after acquiring the packet domain service from the service provider.

It should be noted that what the user equipment acquires from the base station is the packet domain service, and the subscription information is in a subscribed-content list and stored on the RNC. The so-called subscription information just indicates web pages whose content needs to be cached. What is recorded in the subscribed-content list is a URL and a base station in which a packet domain service corresponding to the URL is stored. The location information refers to the IP address of the NodeB.

The subscription information can only be learned from the RNC and the hub base station, and what is acquired from the location information (that is, a NodeB on which the web page is cached) is the packet domain service.

Optionally, after the packet domain service is acquired from the service provider, if entries of the list of locally cached content are full and the packet domain service cannot be cached, the method may further include:

sending, by the base station to the radio network controller or the hub base station, a notification indicating that the entries of the list of locally cached content are full;

receiving, by the base station, location information of a base station capable of caching the packet domain service and sent by the radio network controller or the hub base station, where the base station capable of caching the packet domain service has a relatively large cache space and is relatively close to the base station whose list of locally cached content is already full of entries; and sending, by the base station, the packet domain service to the base station that corresponds to the location information through an IP link established beforehand, so that the base station records the packet domain service into a list of locally cached content and increments the current popularity value of the packet domain service by 1.

In the embodiment of the present invention, when popularity of content cached on a base station (NodeB) reaches a certain threshold, synchronization to a radio network controller (RNC) is required, so that the RNC accumulates a popularity value of the cached content in a cached-content list, and the NodeB clears a popularity value in a list of locally cached content after the synchronization is performed. That is, with use of a distributed Cache in this embodiment, the RNC does not need to cache a large amount of resource data, thereby greatly saving a storage space of the RNC. In addition, content caching is scattered to various NodeBs, and this is equivalent to expansion of total storage capacity, thereby solving a technical problem about repeated caching of a same resource and implementing sharing inside a network.

Figure 2:
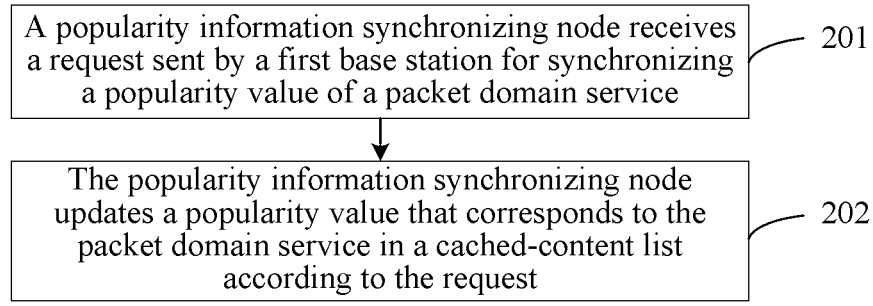
FIG. 2 is a flowchart of a method for cooperative and distributed caching of cache data according to an embodiment of the present invention.

Refer to FIG. 2, which is a flowchart of a method for cooperative and distributed caching of cache data according to an embodiment of the present invention. The method includes the following steps:

Step 201: A popularity information synchronizing node receives a request sent by a first base station for synchronizing a popularity value of a packet domain service, where the packet domain service is web page content or the like.

Certainly, in this step, the popularity information synchronizing node may also simultaneously receive requests sent by multiple base stations for synchronizing popularity values of packet domain services.

Step 202: The popularity information synchronizing node updates a popularity value that corresponds to the packet domain service in a cached-content list according to the request.

Optionally, the method may further include: if popularity of the packet domain service does not reach a preset cache threshold, updating, by the popularity information synchronizing node, current popularity of the packet domain service in a pre-popular content list, and instructing the first base station not to cache the packet domain service.

Optionally, the method may further include: receiving, by the popularity information synchronizing node, a request sent by the first base station for allocating a cache node; querying, by the popularity information synchronizing node, the maintained cached-content list, a subscribed-content list, or the pre-popular content list to determine whether the packet domain service is included; if the popularity information synchronizing node finds a record of a location in which the packet domain service is cached from the subscribed-content list or the pre-popular content list and the popularity value of the packet domain service reaches the cache threshold, determining location information of a second base station and sending a response to the first base station, where the response carries the location information of the second base station; and adding, by the popularity information synchronizing node, a record of a location of the second base station to the cached-content list.

The popularity information synchronizing node may be a radio network controller to which the base stations belong or a hub base station.

Optionally, the method may further include:

querying, by the radio network controller or the hub base station, the cached-content list when receiving a request sent by the first base station for querying a packet domain service; and if the radio network controller or the hub base station finds a record of a location in which the packet domain service is cached from the cached-content list, sending location information of a base station on which the packet domain service is cached to the base station, and incrementing the popularity value of the packet domain service by 1;

if the radio network controller or the hub base station does not find a record of a location in which the packet domain service is cached from the cached-content list, querying the subscribed-content list, and if the record of the location in which the packet domain service is cached is found in the subscribed-content list, sending the found information of the location in which the packet domain service is cached to the base station for caching, adding the found packet domain service and location information of a base station on which the packet domain service is cached to the cached-content list, and marking the current popularity of the packet domain service as 0;

if the radio network controller or the hub base station does not find the record of the location in which the packet domain service is cached from the subscribed-content list, querying the pre-popular content list, and if the record of the location in which the packet domain service is cached is not found in the pre-popular content list, notifying the NodeB that no information of the location in which the packet domain service is cached is found, adding a not-found record of the location in which the packet domain service is cached to the pre-popular content list, and recording the current popularity of the packet domain service as 1;

if the radio network controller or the hub base station finds the record of the location in which the packet domain service is cached from the pre-popular content list and when the popularity value of the packet domain service reaches the preset cache threshold, instructing the base station to cache location information of a service provider of the packet domain service, so that the base station locally caches the packet domain service acquired from the service provider.

Optionally, the method may further include:

if the radio network controller or the hub base station determines that the popularity value of the packet domain service does not reach the preset cache threshold, updating the current popularity of the packet domain service in the pre-popular content list, and notifying the base station that the packet domain service does not need to be cached.

Optionally, the method may further include:

receiving, by the radio network controller or the hub base station, a notification sent by one or more base stations, indicating that entries of a list of locally cached content are full;

querying, by the radio network controller or the hub base station, the cached-content list, the subscribed-content list, or the pre-popular content list maintained by the radio network controller or the hub base station to determine whether the packet domain service is included; and if the radio network controller or the hub base station finds a record of the location (such as an IP address) in which the packet domain service is cached from the subscribed-content list or the pre-popular content list and when the popularity value of the accessed packet domain service reaches the cache threshold, acquiring remaining cache space of all base stations except for a base station that has sent a request for accessing the packet domain service, selecting a base station that has a relatively large remaining cache space among all the base station and is relatively close to the base station that has sent a request for accessing the packet domain service, so as to cache the packet domain service, and sending a location of the selected base station; and adding a record of the location of the base station to the cached-content list.

Optionally, the method may further include:

if none of the cache space is appropriate after the radio network controller or the hub base station acquires the remaining cache space of all base station except for the base station that has sent a request for accessing the packet domain service, selecting cached content whose popularity is relatively low from the list of locally cached content, instructing the base station to delete the cached content whose popularity is relatively low from the list of locally cached content and cache the found packet domain service into the list of locally cached content after the deletion.

In the embodiment of the present invention, a manner of cooperative caching is used between NodeBs and an RNC, and an idea of distributed storage is applied to a radio network. That is, popularity information of a packet domain service accessed by a user equipment is maintained on an RNC side, and a local Cache of hot content is deployed in a distributed manner on multiple NodeBs managed by the RNC. IP links are newly established and corresponding signaling is added beforehand between the NodeBs subordinate to the RNC to form a network that includes the RNC and the subordinate NodeBs, so as to mutually transmit cached files and storage locations of the cached files on a UTRAN side.

As can be seen from the foregoing embodiment, due to use of the distributed storage, a NodeB side only needs to maintain one list (a list of locally cached content, including a resource name and local popularity), that is, uniform resource locators (URL, Uniform Resource Locator, or web page address) and local popularity of content cached on the NodeB. The RNC needs to maintain three lists: (1) a list of current popularity and storage locations of content cached on each NodeB, that is, a cached-content list (including a resource name, current popularity, and a storage location); (2) a pre-popular content list (including a resource name and current popularity), used to record popularity of pre-popular content, that is, content that was once accessed by a user equipment but whose popularity does not yet reach a Cache threshold; and (3) a list (including a subscribed resource) of subscribed cache content, or a maintenance list of subscribed Cache content, that is, a list of content specified by a subscription SP for caching.

With use of the distributed Cache, the RNC does not need to cache a large amount of resource data but only needs to cache three lists, thereby greatly saving a storage space of the RNC. In addition, content caching is scattered to various NodeBs, and this is equivalent to expansion of total storage capacity. As a hub network element of the Cache network, the RNC has little impact on an existing system. Hardware of the RNC does not require any change when a common UMTS network is upgraded to the Cache network. During subsequent upgrade of the UMTS Cache network to LTE, network delayering does not influence an existing solution, as long as the three lists stored on the RNC are maintained on a new hub network element.

As a hub network element of the meshed Cache network, the RNC only needs to maintain three lists to manage Cache content of the entire network. Classification and a search sequence of the three lists may enable the RNC to schedule the Cache network at the fastest speed. According to the idea of the meshed Cache network, content cached on each NodeB on the network can provide a Cache service for user equipments covered by all NodeBs on the network, thereby greatly improving a Cache hit rate and ensuring the hit rate even in a mobility scenario.

Certainly, in this embodiment, a hub base station (HUB NodeB) may be arranged between the base stations and the radio network controller. That is, work of summarizing popularity is deployed on the HUB NodeB, and the HUB NodeB records popularity and storage locations of cached files of all the NodeBs connected to the hub NodeB. The NodeBs may also exchange data with each other through the HUB NodeB. In addition, this achieves an objective of saving a transmission bandwidth of an IUB interface, and supports smooth upgrade to an LTE system. A specific implementation process is similar to the foregoing process. Reference may be made to the foregoing description, and no further details are provided herein.

Figure 3:
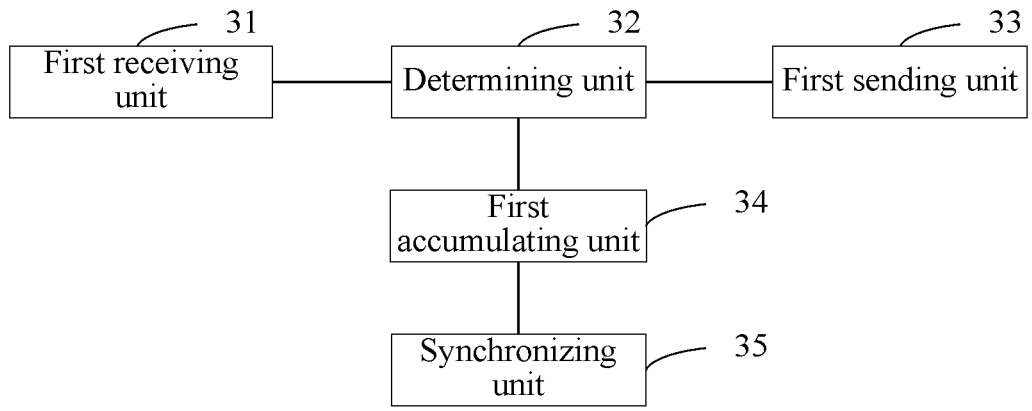
FIG. 3 is a schematic structural diagram of an apparatus for synchronizing a popularity value of cache data according to an embodiment of the present invention.

Accordingly, an embodiment of the present invention further provides an apparatus for synchronizing a popularity value of cache data. FIG. 3 shows a schematic structural diagram of the apparatus. The apparatus includes: a first receiving unit 31, a determining unit 32, a first sending unit 33, a first accumulating unit 34, and a synchronizing unit 35, where the first receiving unit 31 is configured to receive a request for accessing a packet domain service sent by a user equipment; the determining unit 32 is configured to determine whether the packet domain service is recorded in a list of locally cached content and send a determining result, and the list of locally cached content includes a resource name and local popularity; the first sending unit 33 is configured to send, when receiving a determining result of Yes, the packet domain service to the user equipment; the first accumulating unit 34 is configured to accumulate, when receiving the determining result of Yes, a current popularity value of the packet domain service; and the synchronizing unit 35 is configured to send, when the accumulated current popularity value of the packet domain service reaches a preset threshold, the current popularity value to a radio network controller or a hub base station for synchronization, and clear the current popularity value.

Optionally, the apparatus may further include: an acquiring unit, where the acquiring unit is configured to acquire, when receiving a determining result of No, information of a location in which the packet domain service is cached from a cached-content list, a subscribed-content list, or a pre-popular content list maintained by the radio network controller or the hub base station, and acquire the packet domain service from a base station or a service provider that corresponds to the location information; and the first sending unit is further configured to send the acquired packet domain service to the user equipment.

Optionally, the acquiring unit includes: a location information acquiring unit and a first packet domain service acquiring unit, where the location information acquiring unit is configured to acquire, when receiving a determining result indicating that the packet domain service is not locally cached, the information of the location in which the packet domain service is cached from the cached-content list of the radio network controller or the hub base station; and the first packet domain service acquiring unit is configured to acquire the packet domain service from the base station that corresponds to the location information; and the first sending unit is further configured to send the acquired packet domain service to the user equipment.

Optionally, the first packet domain service acquiring unit includes: a direct acquiring unit, and/or an indirect acquiring unit, where the direct acquiring unit is configured to acquire the packet domain service from the base station that corresponds to the location information (such as an IP address) through an established IP link; and the indirect acquiring unit is configured to acquire the packet domain service from the base station that corresponds to the location information through the radio network controller or the hub base station.

Optionally, in the foregoing embodiment, the acquiring unit may further include: a second packet domain service acquiring unit and a first caching unit, where the second packet domain service acquiring unit is configured to acquire the information of the location in which the packet domain service is cached from the subscribed-content list of the radio network controller or the hub base station, with the packet domain service being subscription information, and acquire the packet domain service from the service provider that corresponds to the location information; and the first caching unit is configured to locally cache the packet domain service, and add the acquired subscription information to the list of locally cached content; and the first sending unit is further configured to send the acquired packet domain service to the user equipment.

Optionally, the acquiring unit may further include: a third packet domain service acquiring unit and a second caching unit, where the third packet domain service acquiring unit is configured to acquire, when the packet domain service is not locally cached and the information of the location in which the packet domain service is cached is not found in the cached-content list of the radio network controller or the hub base station, the information of the location in which the packet domain service is cached from the subscribed-content list of the radio network controller or the hub base station, with the packet domain service being subscription information, and acquire the web page content from the service provider that corresponds to the location information; the second caching unit is configured to locally cache the packet domain service and add the acquired subscription information to the list of locally cached content; and the first sending unit is further configured to send the acquired packet domain service to the user equipment.

Optionally, the acquiring unit may further include: a first service provider address acquiring unit, a fourth packet domain service acquiring unit, and a third caching unit; and/ or a second service provider address acquiring unit and a fifth packet domain service acquiring unit, where the first service provider address acquiring unit is configured to acquire, when the packet domain service is not locally cached and the information of the location in which the packet domain service is cached is not found in the cached-content list and the subscribed-content list of the radio network controller or the hub base station, location information of the service provider of the packet domain service and information indicating that the current popularity value of the packet domain service meets the preset threshold from the pre-popular content list of the radio network controller or the hub base station; the fourth packet domain service acquiring unit is configured to acquire the packet domain service from the service provider; the third caching unit is configured to locally cache the acquired packet domain service and add a record to the list of locally cached content; the second service provider address acquiring unit is configured to acquire, when the packet domain service is not locally cached, location information of the service provider of the packet domain service and information indicating that the current popularity value of the packet domain service does not meet the preset threshold from the pre-popular content list of the radio network controller or the hub base station; and the fifth packet domain service acquiring unit is configured to acquire the packet domain service from the service provider; and the first sending unit is further configured to send the packet domain service to the user equipment.

Optionally, after the packet domain service is acquired from the service provider, if entries of the list of locally cached content are full and the packet domain service cannot be cached, the apparatus may further include: a second sending unit, a second receiving unit, and a third sending unit, where the second sending unit is configured to send to the radio network controller or the hub base station a notification indicating that the entries of the list of locally cached content are full; the second receiving unit is configured to receive location information of a base station capable of caching the packet domain service and sent by the radio network controller or the hub base station, and the base station capable of caching the packet domain service has a relatively large cache space and is relatively close to a base station whose list of locally cached content is already full of entries; and the third sending unit is configured to send the packet domain service to the base station that corresponds to the location information through an IP link established beforehand, so that the base station records the packet domain service into a list of locally cached content and increments the current popularity value of the packet domain service by 1.

Optionally, after the packet domain service is acquired from the service provider, if entries of the list of locally cached content are full and the packet domain service cannot be cached, the apparatus may further include: a fourth sending unit, a third receiving unit, a deleting unit, a fourth caching unit, and a second accumulating unit, where the fourth sending unit is configured to send to the radio network controller or the hub base station a notification indicating that the entries of the list of locally cached content are full; the third receiving unit is configured to receive a command sent by the radio network controller or the hub base station for deleting a packet domain service whose popularity is relatively low in the list of locally cached content; the deleting unit is configured to delete the packet domain service whose popularity is relatively low from the list of locally cached content according to the command; the fourth caching unit is configured to cache the packet domain service into the list of locally cached content after the deletion; and the second accumulating unit is configured to increment the current popularity value of the packet domain service by 1.

For details about a process of implementing functions and purposes of each unit in the apparatus, reference may be made to a corresponding implementation process of the foregoing methods and no further details are provided herein.

Figure 4:
FIG. 4 is a schematic structural diagram of an apparatus for cooperative and distributed caching of cache data according to an embodiment of the present invention.

Accordingly, an embodiment of the present invention further provides an apparatus for cooperative and distributed caching of cache data. FIG. 4 shows a schematic structural diagram of the apparatus. The apparatus includes: a first receiving unit 41 and a synchronizing unit 42, where the first receiving unit 41 is configured to receive a request sent by one or more base stations for synchronizing a popularity value of a packet domain service; and the synchronizing unit 42 is configured to update a popularity value that corresponds to the packet domain service in a cached-content list according to the request.

Optionally, the apparatus may further include: a first querying unit, a first sending unit, and a first accumulating unit, where the first querying unit is configured to query, when receiving a request sent by the base station for querying a packet domain service, the cached-content list to determine whether information of a location in which the packet domain service is cached is recorded, and send a first query result; the first sending unit is configured to send, when receiving a query result indicating that a record of the packet domain service is found in the cached-content list, location information of a base station corresponding to the packet domain service to the base station; and the first accumulating unit is configured to increment the popularity value of the packet domain service by 1.

Optionally, the apparatus may further include: a second querying unit, a second sending unit, and a first recording unit, where the second querying unit is configured to query, when receiving the first query result indicating that no record of the packet domain service is found in the cached-content list, a subscribed-content list, and send a second query result; the second sending unit is configured to send, when receiving the second query result indicating that a record of the packet domain service is found in the subscribed-content list, found information of the location in which the packet domain service is cached to the base station for caching; and the first recording unit is configured to add the found packet domain service and location information of a base station on which the packet domain service is cached to the cached-content list, and mark current popularity of the packet domain service as 0.

Optionally, the apparatus may further include: a third querying unit, a first determining unit, a third sending unit, and an updating unit, where the third querying unit is configured to query, when receiving the second query result indicating that no record of the packet domain service is found in the subscribed-content list, a pre-popular content list, and send a third query result; the first determining unit is configured to determine, when receiving the third query result indicating that a record of the packet domain service is found in the pre-popular content list, whether the popularity value of the packet domain service reaches a preset cache threshold, and send a determining result; the third sending unit is configured to instruct, when receiving a determining result indicating that the popularity value of the packet domain service reaches the preset cache threshold, the base station to cache location information of a service provider of the packet domain service, so that the base station locally caches the packet domain service acquired from the service provider; and the updating unit is configured to update, when receiving a determining result indicating that the popularity value of the packet domain service does not reach the preset cache threshold, the current popularity of the packet domain service in the pre-popular content list, and notify the base station that the packet domain service does not need to be cached.

Optionally, the apparatus may further include: a fourth sending unit and a second recording unit, where the fourth sending unit is configured to notify, when receiving the third query result indicating that no record of the packet domain service is found in the pre-popular content list, the base station that no information of the location in which the packet domain service is cached is found; and the second recording unit is configured to add a not-found record of the location in which the packet domain service is cached to the pre-popular content list, and record the current popularity of the packet domain service as 1.

Optionally, the apparatus may further include: a second receiving unit, a fourth querying unit, a second determining unit, an acquiring unit, a first selecting unit, and a third recording unit, where the second receiving unit is configured to receive a notification sent by one or more base stations, indicating that entries of a list of locally cached content are full; the fourth querying unit is configured to query the maintained cached-content list, a subscribed-content list, or a pre-popular content list to determine whether the information of the location in which the packet domain service is cached is recorded; the second determining unit is configured to determine, when the fourth querying unit finds a record of the information of the location in which the packet domain service is cached from the subscribed-content list or the pre-popular content list, whether the popularity value of the accessed packet domain service reaches the cache threshold, and send a determining result; the acquiring unit is configured to acquire, when receiving a determining result indicating that the popularity value of the packet domain service reaches the cache threshold, remaining cache space of all base stations except for a base station that has sent a request for accessing the packet domain service; the first selecting unit is configured to select a base station that has a relatively large remaining cache space among the remaining cache space of all the other base stations and is relatively close to the base station that has sent a request for accessing the packet domain service, so as to cache the packet domain service, and send location information of the selected base station; and the third recording unit is configured to add a record of the location information of the base station to the cached-content list.

Optionally, the apparatus may further include: a second selecting unit and a fifth sending unit, where the second selecting unit is configured to select, when no appropriate remaining cache space can be selected from the remaining cache space of all the other base stations, cached content whose popularity is relatively low from the list of locally cached content; and the fifth sending unit is configured to instruct the base station to delete the cached content whose popularity is relatively low from the list of locally cached content, and instruct the base station to cache the found packet domain service into the list of locally cached content after the deletion.

For details about a process of implementing functions and purposes of each unit in the apparatus, reference may be made to a corresponding implementation process of the foregoing methods and no further details are provided herein.

Figure 5:
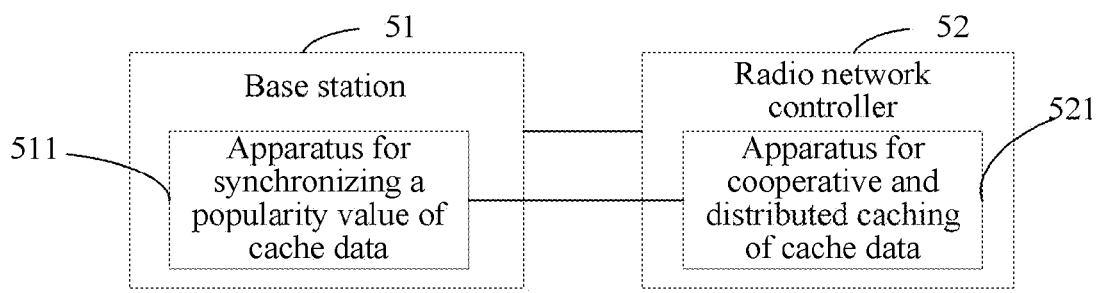
FIG. 5 is a schematic structural diagram of a system for synchronizing a popularity value of cache data according to an embodiment of the present invention.

Accordingly, an embodiment of the present invention further provides a system for synchronizing a popularity value of cache data. FIG. 5 shows a schematic structural diagram of the system. The system includes: one or more base stations 51 (this embodiment uses one base station as an example but is not limited to this), and a radio network controller or hub base station 52, where the base station 51 is integrated with an apparatus 511 for synchronizing a popularity value of cache data, and the radio network controller or hub base station 52 is integrated with an apparatus 521 for cooperative and distributed caching of cache data.

The apparatus 511 for synchronizing a popularity value of cache data is configured to receive a request for accessing a packet domain service sent by a user equipment; if it is determined that the packet domain service is locally cached, send the packet domain service to the user equipment and accumulate a current popularity value of the packet domain service in a list of locally cached content; and when the accumulated current popularity value reaches a preset threshold, send the current popularity value of the packet domain service to the apparatus 521 for cooperative and distributed caching of cache data, and clear the current popularity value.

The apparatus 521 for cooperative and distributed caching of cache data is configured to receive a request for synchronizing the current popularity value of the packet domain service, where the request is sent by the apparatus 511 for synchronizing a popularity value of cache data; and update a popularity value that corresponds to the packet domain service in a cached-content list according to the request.

For details about each unit included in the apparatus for synchronizing a popularity value of cache data and a process of implementing functions and purposes of each unit, reference may be made to the foregoing description and no further details are provided herein.

For details about each unit included in the apparatus for cooperative and distributed caching of cache data and a process of implementing functions and purposes of each unit, reference may be made to the foregoing description and no further details are provided herein.

Based on an implementation process of the foregoing methods, an embodiment of the present invention further provides an apparatus for synchronizing a popularity value of distributed cache data. The apparatus is applied to a radio access network that includes a radio network controller and base stations managed by the radio network controller. A cache configured to store hot content is deployed in a distributed manner on the multiple base stations. The apparatus includes: a first receiving unit, a determining unit, a first sending unit, a first accumulating unit, and a synchronizing unit, where the first receiving unit is configured to receive a request for accessing a packet domain service sent by a user equipment; the determining unit is configured to respond to the packet domain service request, determine whether the packet domain service is locally cached, and send a determining result; the first sending unit is configured to send, when receiving a determining result of Yes, the packet domain service to the user equipment; the first accumulating unit is configured to increment, when receiving the determining result of Yes, a current popularity value of the packet domain service in a list of locally cached content according to a preset function; and the synchronizing unit is configured to send, when the current popularity value of the packet domain service is accumulated to a preset threshold, the current popularity value of the packet domain service to a popularity information synchronizing node on the radio access network for synchronization, and clear the current popularity value locally cached by a first base station.

Optionally, the apparatus may further include: an acquiring unit, configured to acquire, when receiving a determining result of No sent by the determining unit, information of a location in which the packet domain service is cached from a cached-content list, a subscribed-content list, or a pre-popular content list maintained by the popularity information synchronizing node, and acquire the packet domain service from a base station or a service provider that corresponds to the location information; and the first sending unit is further configured to send the acquired packet domain service to the user equipment.

Optionally, the apparatus may further include: a second sending unit, a second receiving unit, and a forwarding unit, where the second sending unit is configured to send to the popularity information synchronizing node a request for allocating a cache node; the second receiving unit is configured to receive a response of the popularity information synchronizing node, where the response carries location information of a second base station that is allocated by the popularity information synchronizing node and is capable of caching the packet domain service; and the forwarding unit is configured to send the packet domain service to the second base station according to the location information, so that the second base station caches the packet domain service and updates the current popularity value of the packet domain service according to the preset function.

Optionally, the apparatus may further include: a third sending unit, a third receiving unit, and a deleting unit, where the third sending unit is configured to send a cached-content deletion request to the popularity information synchronizing node; the third receiving unit is configured to receive a cached-content deletion response sent by the popularity information synchronizing node; and the deleting unit is configured to delete a packet domain service of locally cached content according to the cached-content deletion response.

For details about a process of implementing functions and purposes of each unit in the apparatus, reference may be made to corresponding steps of the foregoing methods and no further details are provided herein.

Accordingly, an embodiment of the present invention further provides an apparatus for cooperative and distributed caching of cache data. The apparatus includes: a first receiving unit and a synchronizing unit, where the first receiving unit is configured to receive a request sent by at least one first base station for synchronizing a popularity value of a packet domain service; and the synchronizing unit is configured to update a popularity value that corresponds to the packet domain service in a cached-content list according to the request.

Accordingly, the apparatus may further include: an updating unit and a notifying unit, where the updating unit is configured to update current popularity of the packet domain service in a pre-popular content list when popularity of the packet domain service does not reach a preset cache threshold; and the notifying unit is configured to instruct a first base station not to cache the packet domain service.

Accordingly, the apparatus may further include: a second receiving unit, a querying unit, a determining unit, a first sending unit, and an adding unit, where the second receiving unit is configured to receive a request sent by the first base station for allocating a cache node; the querying unit is configured to query the maintained cached-content list, a subscribed-content list, or the pre-popular content list to determine whether the packet domain service is cached, and send a query result; the determining unit is configured to determine, when receiving a query result indicating that a record of a location in which the packet domain service is cached is found in the subscribed-content list or the pre-popular content list and the popularity value of the packet domain service reaches the cache threshold, location information of a second base station; the first sending unit is configured to send a response to the first base station, where the response carries the location information of the second base station; and the adding unit is configured to add a record of a location of the second base station to the cached-content list.

For details about a process of implementing functions and purposes of each unit in the apparatus, reference may be made to corresponding steps of the foregoing methods and no further details are provided herein.

Accordingly, an embodiment of the present invention further provides a system for synchronizing a popularity value of distributed cache data, including at least one base station and a radio network controller or a hub base station, where the base station is integrated with an apparatus for synchronizing a popularity value of cache data and the radio network controller or the hub base station is integrated with an apparatus for cooperative and distributed caching of cache data.

The apparatus for synchronizing a popularity value of cache data is configured to receive a request for accessing a packet domain service sent by a user equipment, respond to the packet domain service request, and if it is determined that the packet domain service is locally cached, send the packet domain service to the user equipment and increment a current popularity value of the packet domain service in a list of locally cached content according to a preset function; and when the current popularity value of the packet domain service is accumulated to a preset threshold, send the current popularity value of the packet domain service to a popularity information synchronizing node on a radio access network for synchronization, and clear the current popularity value locally cached.

The apparatus for cooperative and distributed caching of cache data is configured to receive a request for synchronizing the current popularity value of the packet domain service, where the request is sent by the apparatus for synchronizing a popularity value of cache data; and update a popularity value that corresponds to the packet domain service in a cached-content list according to the request.

For units included in the apparatus for synchronizing a popularity value of cache data, reference may be made to the foregoing description and no further details are provided herein; and for units included in the apparatus for cooperative and distributed caching of cache data, reference may be made to the foregoing description and no further details are provided herein.

For ease of understanding by a person of ordinary skill in the art, the following describes a process of implementing cooperation between an RNC and NodeBs with reference to several application scenarios.

Figure 6:
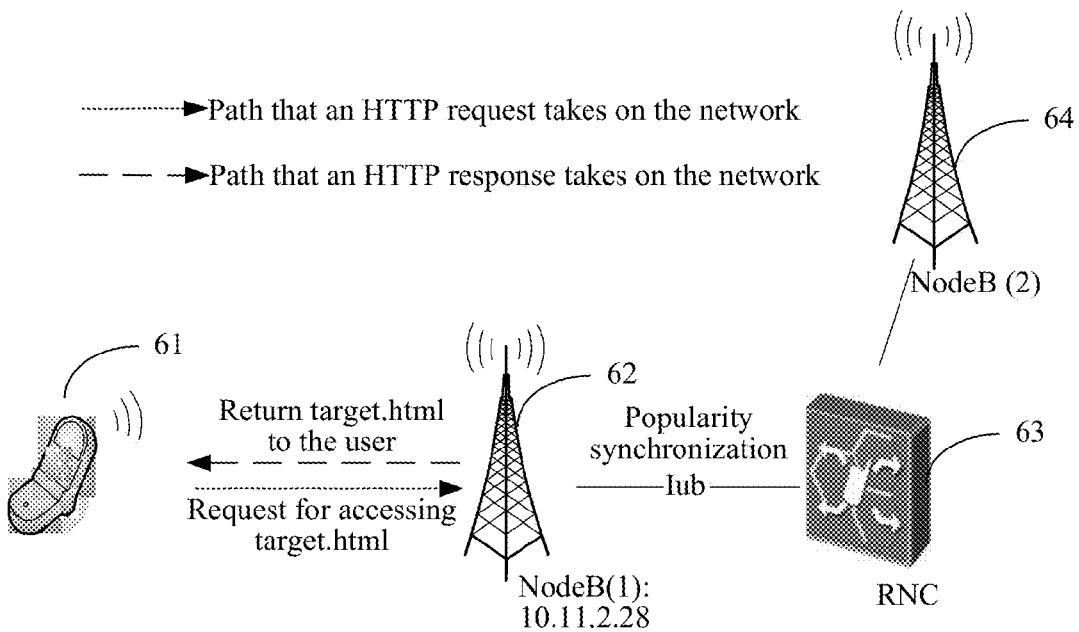
FIG. 6 is a schematic structural diagram of a system for synchronizing a popularity value of cache data according to Embodiment 1 of the present invention.

Refer to FIG. 6, which is a schematic structural diagram of a system for synchronizing a popularity value of cache data according to Embodiment 1 of the present invention. In this embodiment, a packet domain service accessed by a user equipment is locally hit. That is, the packet domain service accessed by the user equipment is recorded in a list of locally cached content (shown in Table 1) of a first base station. This embodiment uses multiple base stations as an example but is not limited to this. Popularity information of the packet domain service accessed by the user equipment is maintained on an RNC side (that is, a cached-content list and a pre-popular content list are established, and a subscription information list or the like may be further included; for details, reference may be made to Table 2, Table 3, and Table 4 below). A local Cache of hot content is deployed in a distributed manner in lists of locally cached content on multiple NodeBs managed by the RNC. IP links are newly established and corresponding signaling is added between the NodeBs subordinate to the RNC to form a network that includes the RNC and the subordinate NodeBs, so as to mutually transmit cached files and storage locations of the cached files on a UTRAN side.

TABLE 1

| Resource Name | Local Popularity Value |
|---|---|
| target.html | 3 |
| red.html | 4 |
| ... | ... |

TABLE 2

| Resource Name | Current Popularity Value | Storage Location |
|---|---|---|
| target.html | 20 | 10.11.2.28 |
| blue.html | 18 | 10.11.2.36 |
| red.html | 15 | 10.11.2.28 |
| ... | ... | ... |

TABLE 3

| Subscribed Resource |
|---|
| a.html |
| b.html |
| ... |

TABLE 4

| Resource Name | Current Popularity Value |
|---|---|
| 1.html | 6 |
| 2.html | 3 |
| ... | ... |

As shown in FIG. 6, a user equipment 61, a first base station 62 (NodeB), an RNC 63, and a second base station 64 are included. In this embodiment, the user equipment 61 is within coverage of the first base station 62, and requests accessing a packet domain service (content of target.html). The packet domain service is cached (that is, recorded in a list of locally cached content, as shown in Table 1) in the list of locally cached content of the first base station 62, and target.html may be directly returned to the user equipment 61, with a popularity value of this resource being simultaneously accumulated by 1. When the accumulated popularity value reaches a preset threshold, the accumulated popularity value is synchronized to the RNC 63 through an IUB interface (That is, a request for synchronizing the popularity value is sent to the RNC 63), so that popularity summarization is implemented on an RNC 63 and the first base station 62 locally records a target; and at the same time a current popularity value of the packet domain service is cleared.

The RNC 63 needs to maintain popularity information of cached content of n NodeBs managed by the RNC 63 and record a NodeB on which the content is stored.

That is, in this embodiment, when receiving a request for locally cached content, each NodeB needs to accumulate a popularity value of the locally cached content, and send a request for synchronizing the popularity value to the RNC when the accumulated popularity value reaches a certain threshold. The locally cached content and the corresponding popularity value are recorded in a list of locally cached content.

Figure 7:
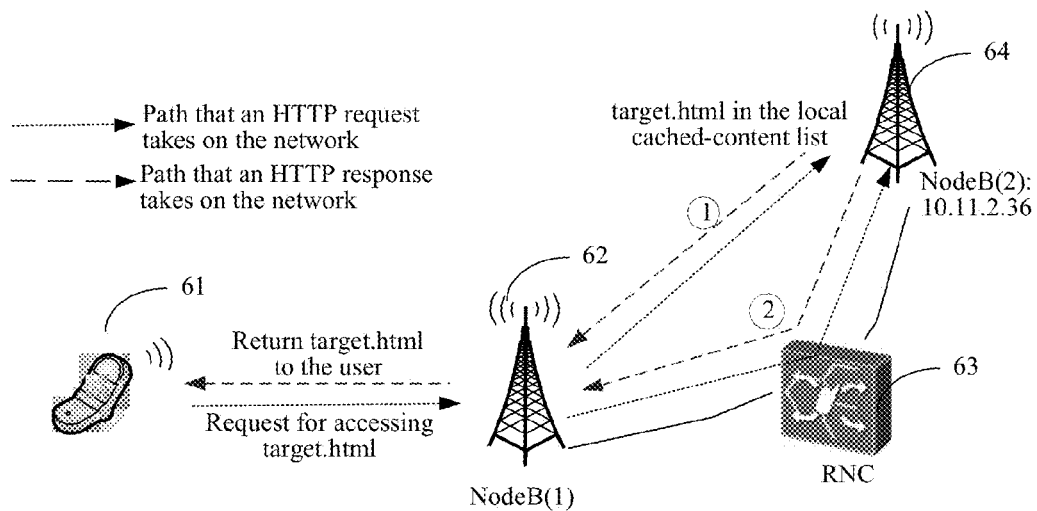
FIG. 7 is a schematic structural diagram of a system for synchronizing a popularity value of cache data according to Embodiment 2 of the present invention.

Refer to FIG. 7, which is a schematic structural diagram of a system for synchronizing a popularity value of cache data according to Embodiment 2 of the present invention. A packet domain service accessed by a user equipment hits another NodeB managed by the RNC. In this embodiment, hitting the second base station is used as an example.

On a basis of Embodiment 1, the user equipment 61 sends a request for accessing target.html to the first NodeB 62; the first NodeB 62 determines that the packet domain service is not cached in the list of locally cached content, and the first NodeB 62 inquires the RNC 63 to know whether the content is cached on (that is, hits) another NodeB; after receiving the inquiry, the RNC 63 first queries a cached-content list and finds that the content is cached (as shown in Table 5) in a list of locally cached content of the second NodeB 64; and then the RNC 63 sends an address of the second NodeB 64 to the first NodeB 62, and at the same time increments current popularity corresponding to the content by 1.

TABLE 5

| Resource Name | Local Popularity Value |
|---|---|
| target.html | 3 |
| red.html | 2 |
| ... | ... |

After receiving the result sent by the RNC 63, the first NodeB 62 may send a request, through an IP link established on a private interface between the first NodeB 62 and the second NodeB 64, to the second NodeB 64 to acquire the packet domain service, and forward the packet domain service to the user equipment 61 after acquiring the packet domain service. In addition, the first NodeB 62 may also acquire the packet domain service from the second NodeB 64 through the RNC 63. Its process is a well-known technology in this field, and no further details are provided herein.

In this embodiment, a transmission link between the first NodeB 62 and the second NodeB 64 may be a physical transmission link shown by ① in FIG. 7 or may also be implemented by a virtual link shown by ② in FIG. 7, that is, forwarding through the RNC.

Figure 8:
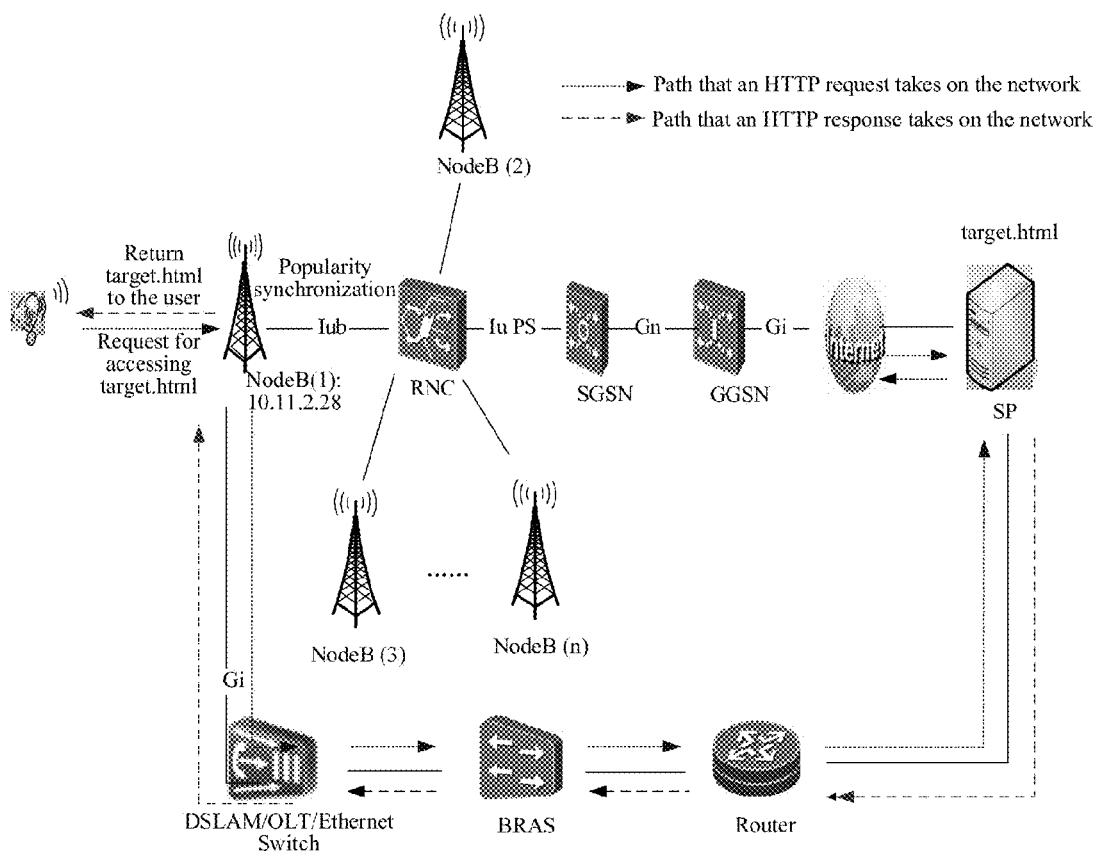
FIG. 8 is a schematic structural diagram of a system for synchronizing a popularity value of cache data according to Embodiment 3 of the present invention.

Refer to FIG. 8, which is a schematic structural diagram of a system for synchronizing a popularity value of cache data according to Embodiment 3 of the present invention. A packet domain service accessed by a user equipment hits a subscribed-content list. In this embodiment, network elements involved in this specification further include the other network elements shown in the figure. They are not described one by one in this embodiment.

As shown in the figure, on a basis of Embodiment 2, the user equipment accesses target.html through the first NodeB, and this content is not cached on the first NodeB. The first NodeB 62 inquires the RNC to know whether the content is cached on the other NodeBs. After receiving the inquiry, the RNC queries the cached-content list and finds that there is no record of a location in which the content is cached, and then queries the subscribed-content list. If the location in which the content is cached is found in the subscribed-content list and the content is subscribed Cache content, the inquirer (that is, the first NodeB) is instructed to directly cache the location of the subscribed Cache content, so that the content may be acquired from a service provider that corresponds to the location. In addition, the RNC adds a NodeB IP address of the subscribed Cache content to the cached-content list and records current popularity of the content as 0.

Later, when the first NodeB synchronizes the popularity to the RNC, if the RNC finds that the popularity of the content is 0 in the cached-content list, it indicates that the content is subscribed content and the current popularity is not accumulated.

In this embodiment, subscribed content may be configured through a configuration and maintenance terminal on the RNC side. Such a part of content may be cached without reaching a popularity threshold, and is always cached on the first NodeB within a period signed with an SP or before the SP requests an update to the subscribed content. This embodiment uses the first NodeB as an example but is not limited to this.

Figure 9:
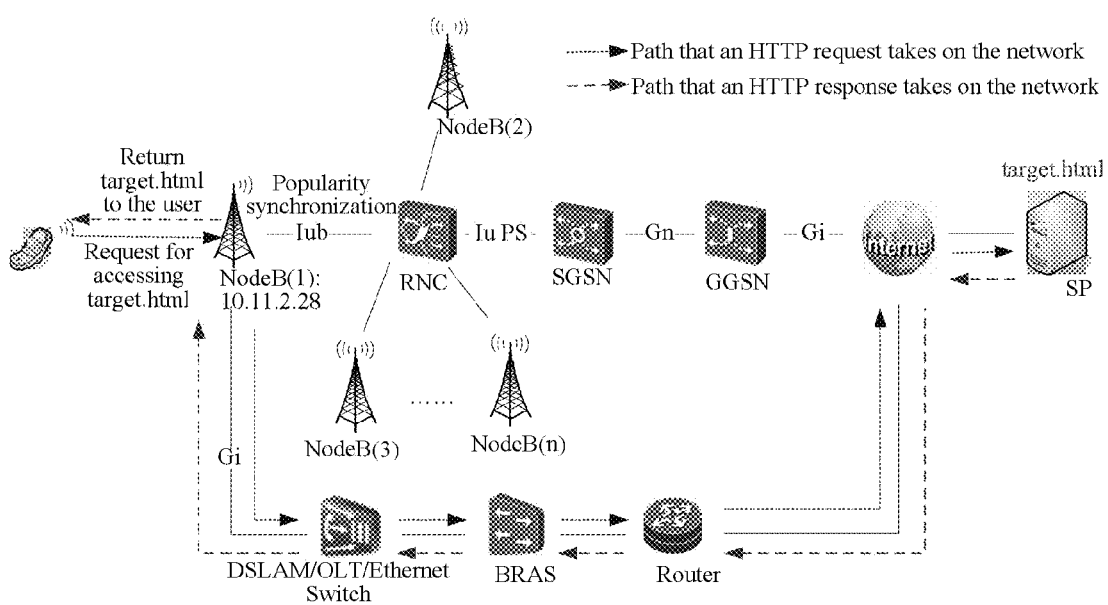
FIG. 9 is a schematic structural diagram of a system for synchronizing a popularity value of cache data according to Embodiment 4 of the present invention.

Refer to FIG. 9, which is a schematic structural diagram of a system for synchronizing a popularity value of cache data according to Embodiment 4 of the present invention. A packet domain service accessed by a user equipment is not hit. In this embodiment, network elements involved in this specification further include the other network elements shown in the figure. They are not described one by one in this embodiment.

As shown in the figure, on a basis of Embodiment 3, the user equipment sends a request for accessing target.html to the first NodeB. The first NodeB determines that the content is not cached on the first NodeB, and the first NodeB inquires the RNC to know whether the content is cached on another NodeB. After receiving the inquiry, the RNC queries the cached list and the subscribed-content list but does not find a relevant record, and then queries the pre-popular content list:

If the pre-popular content list does not have the relevant record, the inquirer (that is, the first NodeB) is notified that the content does not need to be cached, and at the same time an entry (that is, when the pre-popular content does not have the record) is added to the pre-popular content list and the current popularity value is recorded as 1; if the pre-popular content list has the record but the preset cache (Cache) threshold is still not reached after a popularity value of current access is accumulated, the RNC updates current popularity of the entry in the pre-popular content list, and at the same time notifies the inquirer (that is, the first NodeB) that the content does not need to be cached, and notifies it of an IP address of the SP; after receiving the IP address of the SP sent by the RNC, the first NodeB forwards, through a Gi interface, the request to the SP that corresponds to the IP address, acquires the packet domain service requested by the user equipment from the SP, and sends the packet domain service to the user equipment; and after that, the first NodeB does not cache the content acquired from the SP;

if the pre-popular content list has the record and the Cache threshold is reached after a popularity value of current access is accumulated, the RNC instructs the first NodeB to cache content returned by the SP and notifies the first NodeB of an IP address of the SP; at the same time, the RNC adds an entry to the cached-content list to record popularity and a storage address of the content, and deletes the record of the content from the pre-popular content list; and after receiving the IP address of the SP sent by the RNC, the first NodeB forwards the request to the SP through a Gi interface, acquires the content requested by the user equipment from the SP, and locally caches the content.

Figure 10:
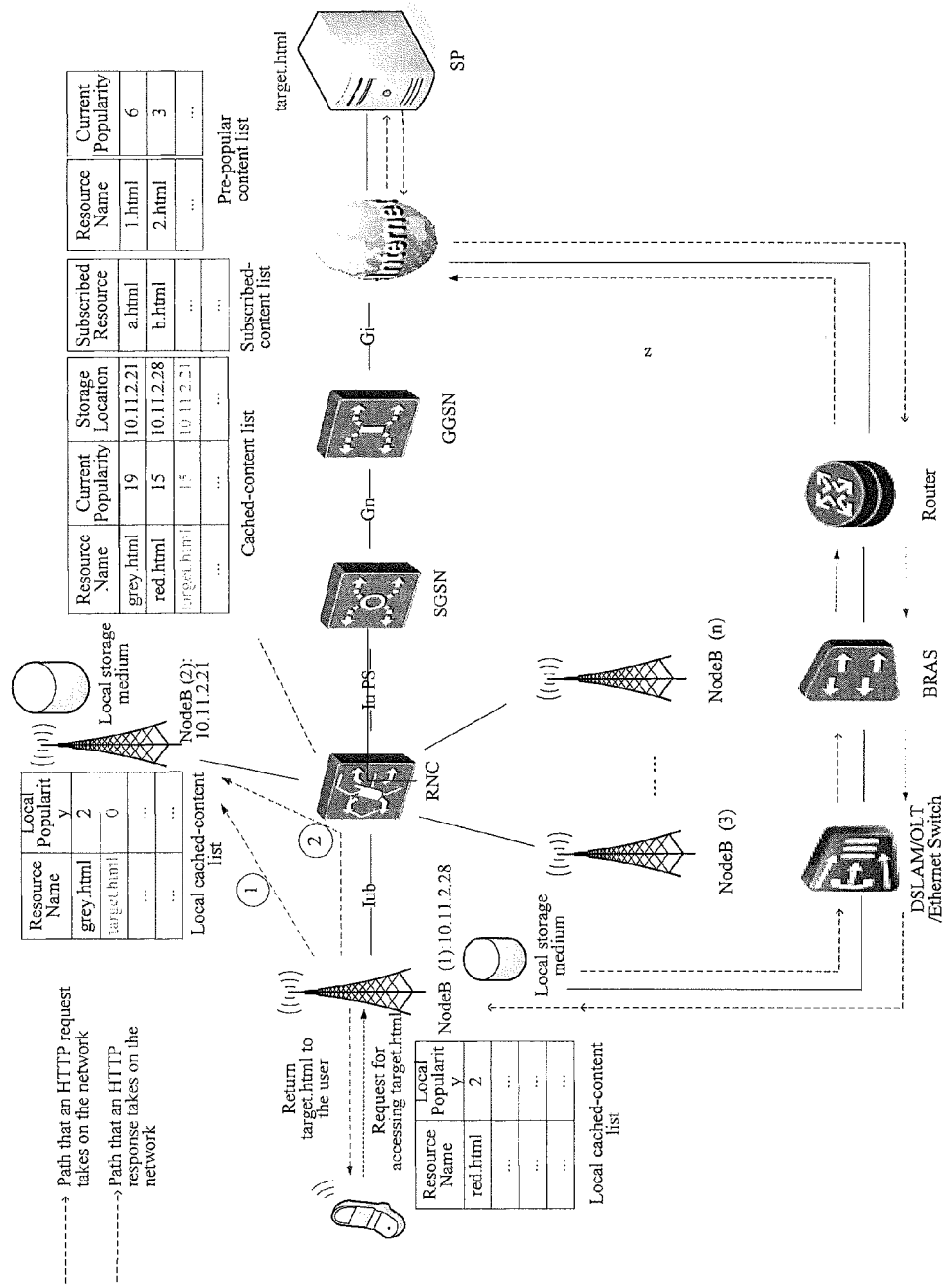
FIG. 10 is a schematic structural diagram of a system for synchronizing a popularity value of cache data according to Embodiment 5 of the present invention.

Refer to FIG. 10, which is a schematic structural diagram of a system for synchronizing a popularity value of cache data according to Embodiment 5 of the present invention. An application scenario of this embodiment is storage location migration. In this embodiment, network elements involved in this specification further include the other network elements shown in the figure. They are not described one by one in this embodiment.

As shown in the figure, on a basis of Embodiment 4, the user equipment accesses target.html through the first NodeB. The content is not cached on the first NodeB, and a cache space of the first NodeB is full, or entries of the list of locally cached content maintained by the first NodeB are full and new content cannot be cached any longer. Then the first NodeB inquires the RNC to know whether another NodeB is hit. An inquiry message carries a field, notifying the RNC that a local cache is full. After receiving the inquiry, the RNC queries the three maintained lists. If the subscribed-content list has a record of the content or the pre-popular content list has a record of the content and the Cache threshold is reached after popularity of current access is accumulated, the content needs to be cached. Then broadcast message is sent to all NodeBs except for the first NodeB, requesting each of the NodeBs to send information about a remaining cache space. In addition, a second NodeB (this is used as an example) that has a relatively large remaining space and is relatively close to the first NodeB is selected according to the remaining space information sent by each of the NodeBs to cache the content. The RNC sends an IP address of the second NodeB 64 to the first NodeB, and a record of the content is added to the cached-content list of the RNC. The first NodeB sends, through the private interface between NodeBs, the content acquired from the SP to the second NodeB for caching. Certainly, the content may also be forwarded through the RNC, and this is not limited in this embodiment.

Figure 11:
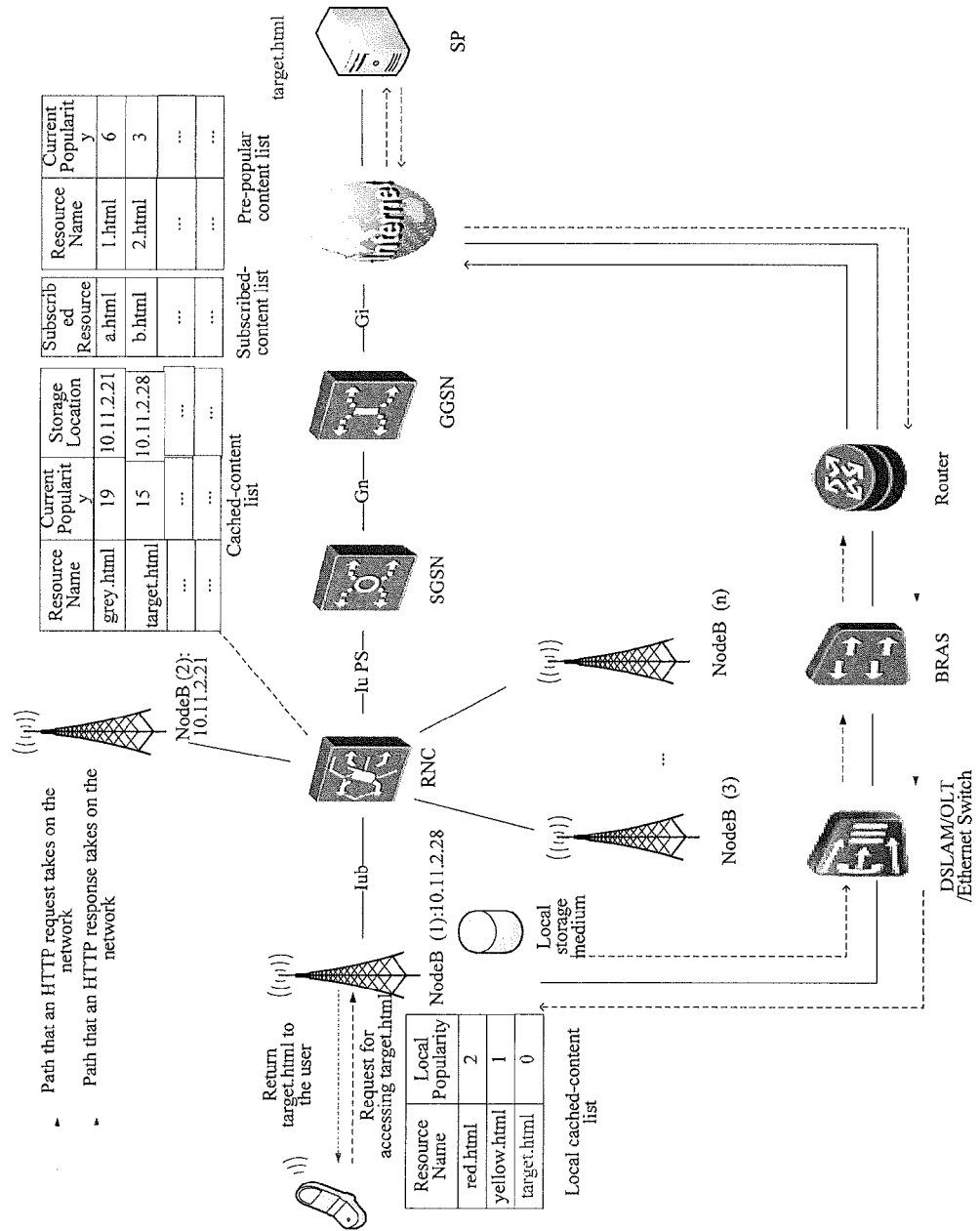
FIG. 11 is a schematic structural diagram of a system for synchronizing a popularity value of cache data according to Embodiment 6 of the present invention.

Refer to FIG. 11, which is a schematic structural diagram of a system for synchronizing a popularity value of cache data according to Embodiment 6 of the present invention. An application scenario of this embodiment is deletion of cached content.

As shown in the figure, on a basis of Embodiment 5, the user equipment accesses target.html through the first NodeB. The content is not cached on the first NodeB, and the cache space of the first NodeB is full, or the entries of the list of locally cached content maintained by the first NodeB are full and new content cannot be cached any longer. Then the first NodeB inquires the RNC to know whether another NodeB is hit. An inquiry message carries a field, notifying the RNC that a local cache is full. After receiving the inquiry, the RNC queries the three maintained lists. If the subscribed-content list has a record of the content or the pre-popular content list has a record of the content and the Cache threshold is reached after popularity of current access is accumulated, the content needs to be cached. If the cached-content list maintained by the RNC is full or the RNC finds after querying the remaining space of each NodeB that there is no appropriate NodeB to cache the new content, the RNC selects content (such as blue.html shown in the figure) whose popularity is relatively low from content cached on the first NodeB, instructs the first NodeB to delete the content from the cache and store the new content target.html. In the lists maintained by the first NodeB and the RNC, entries of the content need to be deleted accordingly.

Figure 12:
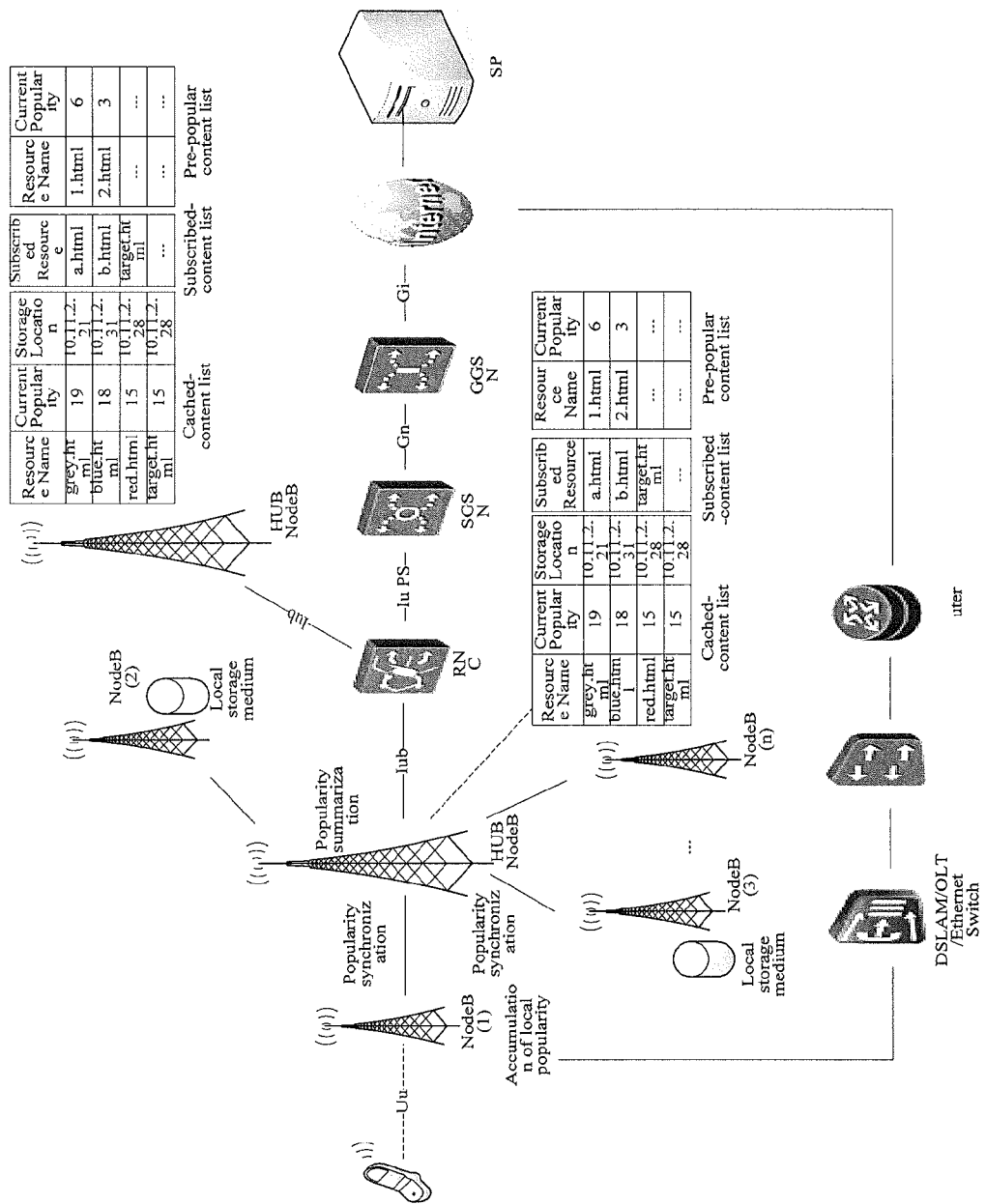
FIG. 12 is a schematic structural diagram of a system for synchronizing a popularity value of cache data according to Embodiment 7 of the present invention.

Refer to FIG. 12, which is a schematic structural diagram of a system for synchronizing a popularity value of cache data according to Embodiment 7 of the present invention. An application scenario of this embodiment is an implementation solution of a distributed cache with reference to a hub base station (HUB NodeB). This embodiment is similar to implementation processes of all the foregoing embodiments, except that a hub base station is arranged between base stations and a radio network controller and the hub base station is connected to each base station, specifically as shown in the figure. In this embodiment, the hub base station has partial functions of a radio network controller, such as maintaining a cached-content list, a subscribed-content list, and/or a prepopular content list, and further has functions of a user plane or the like. The hub base station may exchange information with each base station. A specific implementation process is similar to what is described previously.

In the embodiment of the present invention, NodeBs on which a Cache is deployed and an RNC to which the NodeBs belong together form a meshed network, and this is equivalent to expansion of a storage space. In addition, interworking information is uniformly scheduled through the RNC, and a hit rate of the Cache can be ensured even in a mobility scenario.

In addition, because a local Cache is deployed on a NodeB side, for an upgrade to LTE, it is only necessary to move work of summarizing popularity information to an eNodeB located in a central position of the network. Transmission of the popularity information may be implemented through an X2 interface, and a smooth upgrade to an LTE system can be implemented, thereby saving a system upgrade cost.

According to an idea of a distributed network, the following problem is solved in a manner of cooperative scheduling by the RNC: Content that reaches a cache threshold cannot be cached due to a limited storage space of a single network element.

It should be noted that the relational terms herein such as first and second are used only to differentiate an entity or operation from another entity or operation, and do not require or imply any actual relationship or sequence between these entities or operations. Moreover, the terms "include", "comprise", and any variation thereof are intended to cover a non-exclusive inclusion. Therefore, in the context of a process, a method, an object, or a device that includes a series of elements, the process, the method, the object, or the device not only includes such elements, but also includes other elements not specified expressly, or may include inherent elements of the process, the method, the object, or the device. If no more limitations are made, an element limited by "include a/an . . ." does not exclude other same elements existing in the process, the method, the article, or the device which includes the element.

According to the description of the foregoing embodiments, a person skilled in the art may clearly understand that the present invention may be implemented by software in addition to a necessary universal hardware platform or by hardware only. In most circumstances, the former is an exemplary embodiment. Based on such an understanding, the technical solutions in the present invention essentially, or the part contributing to the prior art may be implemented in a form of a software product. The computer software product is stored in a storage medium, such as a ROM/RAM, a magnetic disk, or an optical disk, and includes several instructions for instructing a computer device (which may be a personal computer, a server, or a network device or the like) to perform all or a part of the methods described in the embodiments of the present invention.

The foregoing descriptions are merely exemplary embodiments of the present invention. It should be noted that a person of ordinary skill in the part may make certain improvements or polishing without departing from the principle of the present invention and such improvements or polishing should fall within the protection scope of the present invention.

What is claimed is:

1. A method for synchronizing a popularity value of distributed cache data, wherein the method is applied to a radio access network, the radio access network comprises a popularity information synchronizing node and base stations managed by the popularity information synchronizing node, a cache configured to store hot content is deployed in a distributed manner in the base stations, and the method comprising:
   receiving, by a first base station from among the base stations of the radio access network, a request for accessing a packet domain service sent by a user equipment;
   responding to the packet domain service request, and if the first base station determines that the packet domain service is locally cached, sending the packet domain service to the user equipment and incrementing a current popularity value of the packet domain service in a list of locally cached content of the first base station according to a preset function; and
   sending, by the first base station when the current popularity value of the packet domain service is accumulated to a preset threshold, the current popularity value of the packet domain service to the popularity information synchronizing node for synchronization, and clearing the current popularity value locally cached by the first base station;
   wherein the synchronization coordinates caching of the packet domain service to one base station from among the base stations for sharing among the base stations.

2. The method according to claim 1, further comprising:
   if the first base station determines that the packet domain service is not locally cached, acquiring information of a location in which the packet domain service is cached using the popularity information synchronizing node;
   acquiring the packet domain service from a base station or a service provider that corresponds to the location information; and
   sending the acquired packet domain service to the user equipment.

3. The method according to claim 1, further comprising:
   sending, by the first base station to the popularity information synchronizing node, a request for allocating a cache node;
   receiving, by the first base station, a response of the popularity information synchronizing node, wherein the response carries location information of a second base station of the radio access network that is allocated by the popularity information synchronizing node and is capable of caching the packet domain service; and
   sending, by the first base station, the packet domain service to the second base station according to the location information, so that the second base station caches the packet domain service and updates the current popularity value of the packet domain service according to the preset function.

4. The method according to claim 1, further comprising:
   sending, by the first base station, a cached-content deletion request to the popularity information synchronizing node;
   receiving, by the first base station, a cached-content deletion response sent by the popularity information synchronizing node; and
   deleting, by the first base station, a packet domain service of locally cached content according to the cached-content deletion response.

5. The method according to claim 1, wherein the popularity information synchronizing node is a hub base station or a radio network controller to which the base stations belong.

6. A method for cooperative and distributed caching of cache data, wherein the method is applied to a radio access network, the radio access network comprises a popularity information synchronizing node and base stations managed by the popularity information synchronizing node, and the method comprising:

receiving, by the popularity information synchronizing node, a request sent by a first base station of the radio access network for synchronizing a popularity value of a packet domain service;

updating, by the popularity information synchronizing node, a popularity value that corresponds to the packet domain service in a cached-content list according to the request; and coordinating among the base stations, by the popularity information synchronizing node, caching of the packet domain service to one base station among the base stations.

7. The method according to claim 6, further comprising:

if popularity of the packet domain service does not reach a preset cache threshold, updating, by the popularity information synchronizing node, current popularity of the packet domain service in a pre-popular content list, and instructing the first base station not to cache the packet domain service.

8. The method according to claim 6, further comprising:

receiving, by the popularity information synchronizing node, a request sent by the first base station for allocating a cache node;

querying, by the popularity information synchronizing node, the maintained cached-content list, a subscribed-content list, or a pre-popular content list to determine whether the packet domain service is comprised;

if the popularity information synchronizing node finds a record of a location in which the packet domain service is cached from the subscribed-content list or the pre-popular content list and the popularity value of the packet domain service reaches a cache threshold, determining location information of a second base station of the radio access network and sending a response to the first base station, wherein the response carries the location information of the second base station; and adding, by the popularity information synchronizing node, a record of a location of the second base station to the cached-content list.

9. An apparatus for synchronizing a popularity value of distributed cache data, wherein the apparatus is applied to a radio access network, the radio access network comprises a popularity information synchronizing node and base stations managed by the popularity information synchronizing node, a cache configured to store hot content is deployed in a distributed manner in the base stations, and the apparatus comprising:

at least one hardware processor configured to:
receive a request for accessing a packet domain service sent by a user equipment;
respond to the packet domain service request, determine whether the packet domain service is locally cached, and send a determining result;
send, when receiving a determining result of Yes, the packet domain service to the user equipment;
to increment, when receiving the determining result of Yes, a current popularity value of the packet domain service in a list of locally cached content of a first base station of the radio access network according to a preset function; and
send, when the current popularity value of the packet domain service is accumulated to a preset threshold, the current popularity value of the packet domain service to the popularity information synchronizing node for synchronization, and clear the current popularity value locally cached by the first base station;

wherein the synchronization coordinates caching of the packet domain service to one base station from among the base stations for sharing among the base stations.

10. The apparatus according to claim 9, wherein the at least on hardware processor is further configured to:

acquire, when receiving a determining result of No, information of a location in which the packet domain service is cached from a cached-content list, a subscribed-content list, or a pre-popular content list maintained by the popularity information synchronizing node, and acquire the packet domain service from a base station from among the base stations or a service provider that corresponds to the location information; and send the acquired packet domain service to the user equipment.

11. The apparatus according to claim 9, wherein the at least one hardware processor is further configured to:

send a request for allocating a cache node to the popularity information synchronizing node;

receive a response of the popularity information synchronizing node, wherein the response carries location information of a second base station of the radio access network that is allocated by the popularity information synchronizing node and is capable of caching the packet domain service; and send the packet domain service to the second base station according to the location information, so that the second base station caches the packet domain service and updates the current popularity value of the packet domain service according to the preset function.

12. The apparatus according to claim 9, wherein the at least one hardware processor is further configured to:

send a cached-content deletion request to the popularity information synchronizing node;

receive a cached-content deletion response sent by the popularity information synchronizing node; and delete a packet domain service of locally cached content according to the cached-content deletion response.

13. An apparatus for cooperative and distributed caching of cache data, wherein the apparatus is applied to a radio access network, the radio access network comprises a popularity information synchronizing node and base stations managed by the popularity information synchronizing node, and the apparatus comprising:

at least one hardware processor configure to:
receive a request sent by at least one first base station of the radio access network for synchronizing a popularity value of a packet domain service;
update a popularity value that corresponds to the packet domain service in a cached-content list according to the request; and
coordinate among the base stations, by the popularity information synchronizing node, caching of the packet domain service to one base station among the base stations.

14. The apparatus according to claim 13, wherein the at least one hardware processor is further configured to:

update current popularity of the packet domain service in a pre-popular content list when popularity of the packet domain service does not reach a preset cache threshold; and instruct the first base station not to cache the packet domain service.

15. The apparatus according to claim 13, wherein the at least one hardware processor is further configured to:

receive a request sent by the first base station for allocating a cache node;

query the maintained cached-content list, a subscribed-content list, or the pre-popular content list to determine whether the packet domain service is comprised, and send a query result;

determine, when receiving a query result indicating that a record of a location in which the packet domain service is cached is found in the subscribed-content list or the pre-popular content list and that the popularity value of the packet domain service reaches a cache threshold, location information of a second base station of the radio access network;

send a response to the first base station, wherein the response carries the location information of the second base station; and add a record of a location of the second base station to the cached-content list.

16. A system for synchronizing a popularity value of distributed cache data, comprising:

a popularity information synchronizing node and at least one base station managed by the popularity information synchronizing node, wherein the at least one base station comprising:

an apparatus for synchronizing a popularity value of distributed cache data, wherein the apparatus is applied to a radio access network, the radio access network comprises the popularity information synchronizing node and base stations, including the at least one base station, managed by the popularity information synchronizing node, a cache configured to store hot content is deployed in a distributed manner in the base stations, the apparatus comprising:

at least one hardware processor configured to:

receive a request for accessing a packet domain service sent by a user equipment;

respond to the packet domain service request, determine whether the packet domain service is locally cached, and send a determining result;

send, when receiving a determining result of Yes, the packet domain service to the user equipment;

increment, when receiving the determining result of Yes, a current popularity value of the packet domain service in a list of locally cached content of a first base station of the radio access network according to a preset function; and send, when the current popularity value of the packet domain service is accumulated to a preset threshold, the current popularity value of the packet domain service to the popularity information synchronizing node for synchronization, and clear the current popularity value locally cached by the first base station; and the popularity information synchronizing node comprising:

an apparatus for cooperative and distributed caching of cache data, wherein the apparatus is applied to the radio access network, the apparatus for cooperative and distributed caching comprising:

at least one hardware processor configured to:

receive a request sent by at least one first base station of the radio access network for synchronizing a popularity value of a packet domain service; and update a popularity value that corresponds to the packet domain service in a cached-content list according to the request.

17. The system according to claim 16, wherein the popularity information synchronizing node is a hub base station or a radio network controller to which the at least one base station belongs.

* * * * *